United States Patent
Arduini

(10) Patent No.: US 8,396,581 B2
(45) Date of Patent: Mar. 12, 2013

(54) CUSTOMIZABLE SCHEDULING TOOL, MANUFACTURING EXECUTING SYSTEM CONTAINING THE TOOL AND METHOD OF USING THE TOOL

(75) Inventor: Milvia Pierpaola Arduini, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 315 days.

(21) Appl. No.: 12/791,209

(22) Filed: Jun. 1, 2010

(65) Prior Publication Data

US 2010/0305736 A1    Dec. 2, 2010

(30) Foreign Application Priority Data

May 29, 2009 (EP) .................................... 09161465

(51) Int. Cl.
*G06F 19/00* (2011.01)
*G05B 19/42* (2006.01)

(52) U.S. Cl. ............. 700/100; 700/87; 700/99; 700/103
(58) Field of Classification Search ............ 700/99–104, 700/86–87
See application file for complete search history.

(56) References Cited

U.S. PATENT DOCUMENTS

| | | | | |
|---|---|---|---|---|
| 4,827,423 A * | 5/1989 | Beasley et al. | .................. | 700/96 |
| 4,937,743 A * | 6/1990 | Rassman et al. | .............. | 705/7.22 |
| 5,093,794 A * | 3/1992 | Howie et al. | .................. | 700/100 |
| 5,223,533 A * | 6/1993 | Forestier et al. | .............. | 514/462 |
| 5,440,480 A * | 8/1995 | Costanza | ...................... | 705/7.25 |
| 5,586,021 A * | 12/1996 | Fargher et al. | ................. | 700/100 |
| 5,596,502 A * | 1/1997 | Koski et al. | ...................... | 700/95 |
| 5,787,283 A * | 7/1998 | Chin et al. | ..................... | 717/101 |
| 5,844,554 A * | 12/1998 | Geller et al. | ................... | 715/744 |
| 6,684,121 B1 * | 1/2004 | Lu et al. | .......................... | 700/108 |
| 6,813,532 B2 * | 11/2004 | Eryurek et al. | ............... | 700/108 |
| 7,236,844 B1 * | 6/2007 | Bai et al. | ........................ | 700/100 |
| 7,454,389 B2 * | 11/2008 | Carpenter et al. | .............. | 706/45 |
| 7,505,827 B1 * | 3/2009 | Boddy et al. | .................. | 700/100 |
| 7,826,915 B1 * | 11/2010 | Logsdon et al. | .............. | 700/109 |
| 7,848,836 B2 * | 12/2010 | Gozzi et al. | ................... | 700/100 |
| 8,103,533 B2 * | 1/2012 | Leslie | ........................... | 705/7.12 |

* cited by examiner

Primary Examiner — Ramesh Patel
(74) Attorney, Agent, or Firm — Laurence A. Greenberg; Werner H. Stemer; Ralph E. Locher

(57) ABSTRACT

A customizable scheduling tool is used in a system for managing and controlling manufacturing processes planned by enterprise resource planning (ERP) and produced by a plant floor. A manufacturing executing system (MES) implements the planned manufacturing process and controls the corresponding production at the plant floor. The scheduling tool contains a set of built in data relating to the plant floor forming a data model and built in formula templates. The scheduling tool contains measures for defining new data, and the measures are operable to edit new fields to expand the built in set of data, and measures for modifying a built-in formula template. Ideally a manufacturing executing system (MES) contains such a tool and utilizes a method of using the tool.

16 Claims, 3 Drawing Sheets

CUSTOMIZABLE SCHEDULING TOOL, MANUFACTURING EXECUTING SYSTEM CONTAINING THE TOOL AND METHOD OF USING THE TOOL

CROSS-REFERENCE TO RELATED APPLICATION

This application claims the priority, under 35 U.S.C. §119, of European application EP 09161465, filed May 29, 2009; the prior application is herewith incorporated by reference in its entirety.

BACKGROUND OF THE INVENTION

Field of the Invention

The present invention relates to a customizable scheduling tool, a manufacturing executing system (MES) containing the tool and to a method of using the tool.

As it is well known, a method for managing and controlling manufacturing processes planned by enterprise resource planning (ERP) and produced by a plant floor, provides a manufacturing executing system (MES) for implementing the planned manufacturing processes and controlling the corresponding production steps at plant floor.

In particular, the enterprise resource planning (ERP) is a system including hardware devices and corresponding software applications for planning the business resources of an enterprise, i.e. material provisions, human resource managements, purchasing, orders, profits, finance, inventory controls, customer managements, etceteras, while the term "plant floor" has been used to indicate a system supporting the control of single machines involved in the manufacturing processes, for example by measuring the number of pieces produced per hour by each machine or the functioning parameters thereof, the quality of the pieces produced and so on.

As schematically represented in FIG. 1, MES is an intermediate layer providing computing machines and software tools 1-$n$ between the ERP upper layer and the plant floor lower layer, including a software tool for production order management 1, which receives requests of production from the ERP, and a software tool for production modeling 2, which supports the phases of selecting and managing the resources to be involved in the manufacturing processes, i.e. employees, machines and materials, in order to realize a planned manufacturing process within required time constrains.

A MES is based on the international standard association (ISA) standard S95 which defines how software tools 1-$n$ may implement the production at the plant floor level and how to communicate with it. More particularly, S95 is substantially based on a manufacturing process represented by a plurality of sequential process segments wherein each sequential process segment contains a plurality of actions to be performed sequentially at the plant floor level.

An execution of the MES software tool described above includes the management of the manufacturing process by activating a sequential process segment and sequentially executing the corresponding plurality of actions.

More particularly, in order to complete a manufacturing process, the software tool for production order management 1 substantially repeats the steps of activating and waiting the end of a plurality of sequential process segments, for a plurality of process segments. In this case, a plurality of software tools, corresponding to respective sequential process segments, is executed, for the duration of the corresponding sequential process segment.

A MES also contains a scheduling and planning tool. The scheduling tool contains applications which provide a set of optimization techniques by built-in algorithms that operate on data coming from the plant floor lower layer. The main goal of optimization techniques of a scheduling tool is the capability of coping with a large number of customer requirements and providing efficient scheduling results in short computing time.

Usually, available commercial and academic scheduling tools provide a number of optimization algorithms that operate on a fixed data model and by fixed built-in computation steps. The user can only tune the algorithms by a number of parameters (e.g. algorithm completion criteria, max number of computing iterations). In case the algorithms and data model that are provided with the scheduling tools do not fit the customer requirements then the software application must be extended by new dedicated features.

Up to now, scheduling applications can be extended by ad-hoc developed software modules. Usually, when an off-the-shelf scheduling application is not able to cope with the customer requirements, the software producer upgrades its product in order to provide new features.

Some available scheduling tools can be extended by software developers by use f of public interfaces that must be implemented in order to interact with the main application. This task is usually highly expensive in terms of time and cost, even if minor customization is required. In fact, many tasks in developing a software module are not dependent on the degree of customization.

For example, a known scheduling tool is able to optimize the average lateness of scheduled orders or task. Orders are characterized by a set of data: an Identifier (ID), the normal duration of the order, the customer, a start date (SD), an end date (ED), etc. A specific "Due Date" (DD) field is used for computing orders lateness. The DD represents the latest time at which the order must be completed in order to avoid penalties. The order lateness (L) is computed according to the formula L=max [0, ED-DD]. The average lateness (AL) is computed by L=Sum$_i$ (L$_i$)/N with i=1 to N (for each of the N orders).

The customer could be interested in computing order lateness in a different way and by applying a slightly different model. For instance, the customer could want to compute the latest start date (LSD) for the order that represents the latest time at which the order must be started in order to avoid penalties. The order lateness (L) could be then computed according to the formula L=max [0, SD-LSD].

Clearly, this model cannot be applied in a fixed scheduling tool without specific new software development.

For the above given example, the new module must implement a complete integration interface, includes the new field (LSD) in the model and recodes the whole optimization algorithm in order to obtain optimization according to the new formula. This approach is then time and cost consuming.

SUMMARY OF THE INVENTION

It is accordingly an object of the invention to provide a customizable scheduling tool, a manufacturing executing system containing the tool and a method of using the tool which overcome the above-mentioned disadvantages of the prior art devices and methods of this general type, which provides a way of customizing the data model and the optimization algorithm of the scheduling tool of a MES system without requiring new software development efforts.

The objective is achieved according to the present invention by a customizable scheduling tool usable in a system for managing and controlling manufacturing processes planned by enterprise resource planning (ERP) and produced by a plant floor. A manufacturing executing system (MES) implements the planned manufacturing process and controls the corresponding production at the plant floor. The scheduling tool contains a set of built in data relating to the plant floor forming a data model and built in formula templates. The scheduling tool further contains means for defining new data, the means being operable to edit new fields to expand the built in set of data, and means for modifying a built-in formula template.

According to the invention, the means for defining new data contains a data model editor having a graphical user interface, and means for editing new data field.

In one embodiment the data model editor has a set of tree organized data forming a build-in data model.

In one embodiment, the customizable scheduling tool has means for adding each new field in the tree organized data model.

In another embodiment the values taken by each new field come from a database model of the scheduling tool or are derived from data of the database model or are external data provided by a user.

In a preferred embodiment, the means for modifying built-in formula template has a formula editor having a graphical user interface operable to create a new formula template.

According to the invention, the formula editor has a tree organised set of variables and/or mathematical operators and/or functions usable to build a new formula template.

In one embodiment, the formula editor has an object browser usable to select at least a variable and/or a mathematical operator and/or a function contained in the formula editor in order to modify a build-in formula template.

The invention also concerns a manufacturing executing system containing a scheduling tool as above defined.

Another object of the invention is a method of customization of a formula template using a customizable scheduling tool as above defined characterized in that the method includes selecting a built-in formula template to modify, selecting at least a variable and a function and/or an operator contained in the formula editor using the browser of the formula editor, verifying that each variable and/or argument used in the function and/or operator is defined, for each variable and/or arguments undefined, allowing the user to browse the data model to associate a proper data field to each variable and/or argument and, linking the new selected data field to the formula template variable or argument.

According to another embodiment, the value of each data field comes from a built-in database of the customizable scheduling tool or from a remote database or has been introduced by the user.

In one embodiment, at least one of the variables selected is linked to a new data field introduced in the data model of the customizable scheduling tool by a user.

Other features which are considered as characteristic for the invention are set forth in the appended claims.

Although the invention is illustrated and described herein as embodied in a customizable scheduling tool, a manufacturing executing system containing the tool and a method of using the tool, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
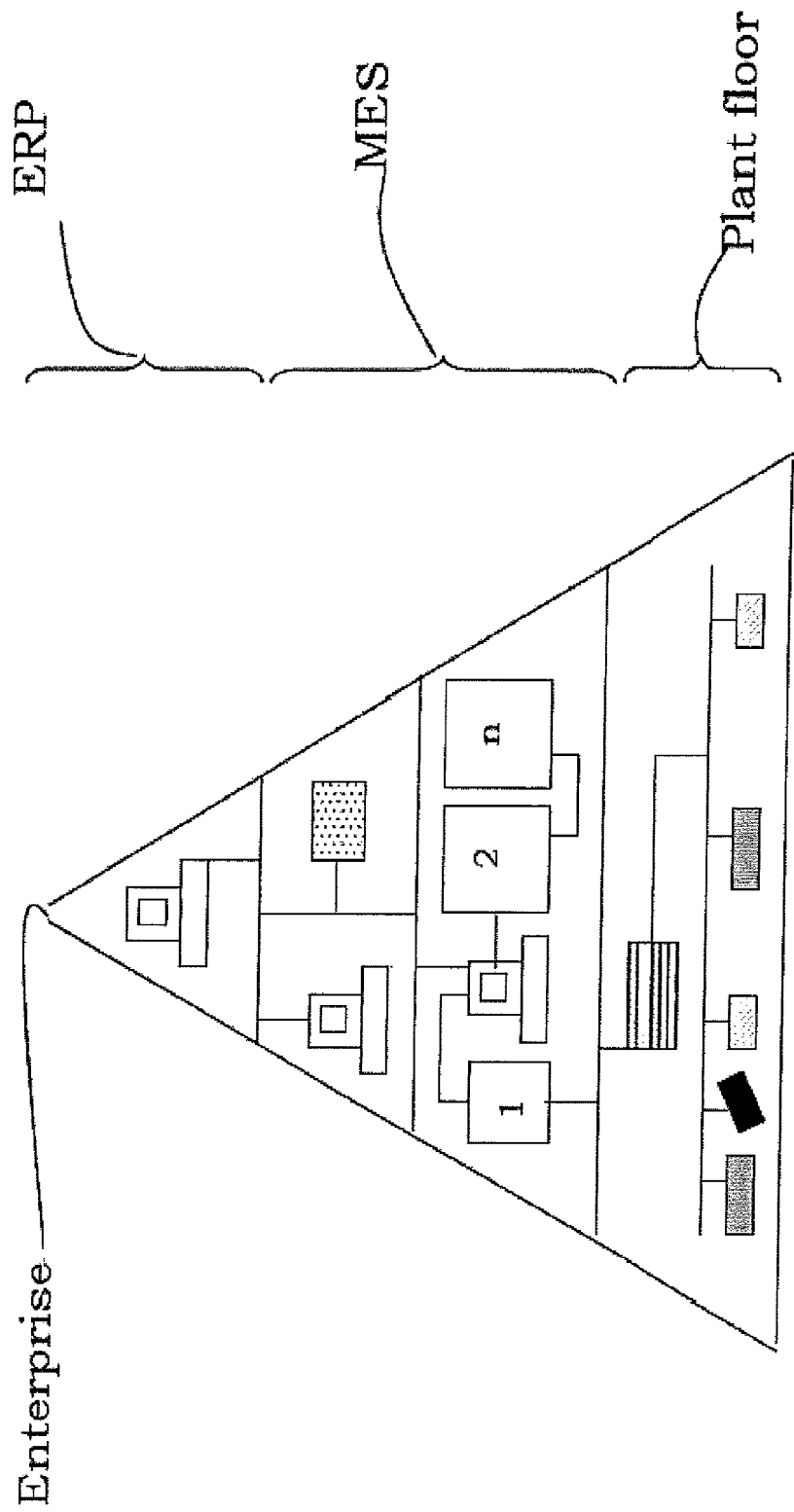
FIG. 1 is an illustration showing architecture for managing and controlling manufacturing processes.
Figure 2:
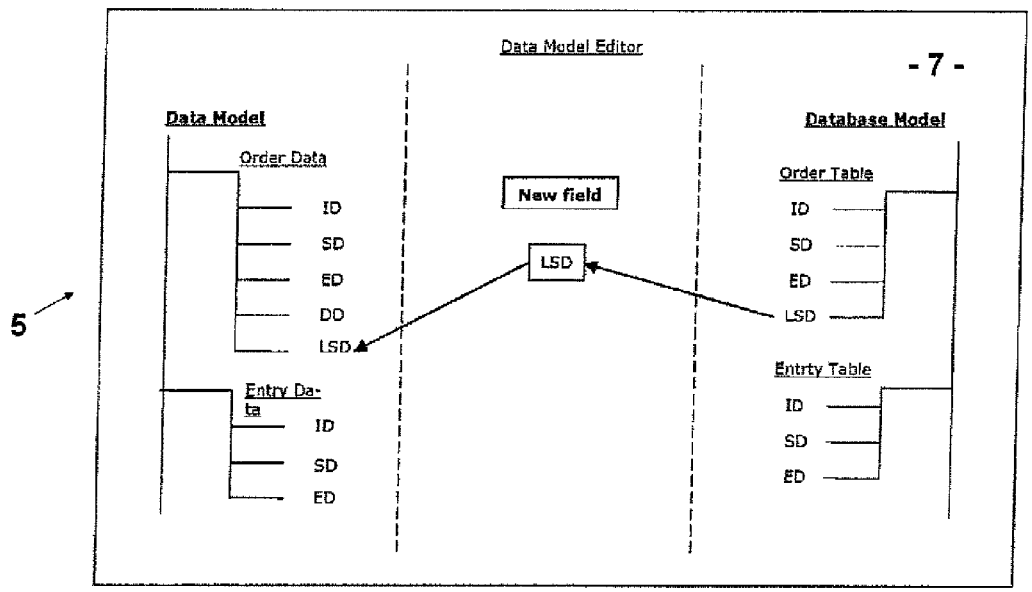
FIG. 2 is an illustration showing a data model editor used to define new data according to the invention.

Referring now to the figures of the drawing in detail and first, particularly, to FIG. 2 thereof, there is shown the scheduling tool of the MES which contains a data model editor 5 having a graphical user interface 7. The data model editor 5 contains a set of tree organized data forming a data model. In this embodiment, the data model is divided in two kinds of data, the order data and the entry data. An order is composed of different manufacturing phases, which are addressed as entry. These phases may involve different pieces of equipment or may correspond to different processing phases. Entry data such as SD, ED, etcetera represent properties of a single phase, while order data are aggregate properties of the whole set of phases. For instance, the SD of an order is equal to the minimum SD of its entries. A plurality of the order data and of the entry data has already been built in the data editor 5. In the embodiment shown in FIG. 2, the order data ID, SD, ED, DD and the entry data ID, SD, ED have already been built-in the data model editor.

The data model editor is also provided with a database model containing all the values taken by the components of the data model during the production process.

The scheduling tool according to the invention provides the user with the graphical user interface 7 where he can edit new fields. The user can then extend the order data model by defining new fields within the data model. For this purpose, the user edits the name of the new fields and creates a link in the data model editor 7 between a database containing all the values of the new field and the data model. The new field is then added by the scheduling tool in the tree organized data model. The values taken by the new field can come from the database model, can be derived from data already available or can be filled with external data provided by the customer via the graphical user interface, as shown in FIG. 2. The new field being then part of the data model can be used by the scheduling tool.

Figure 3:
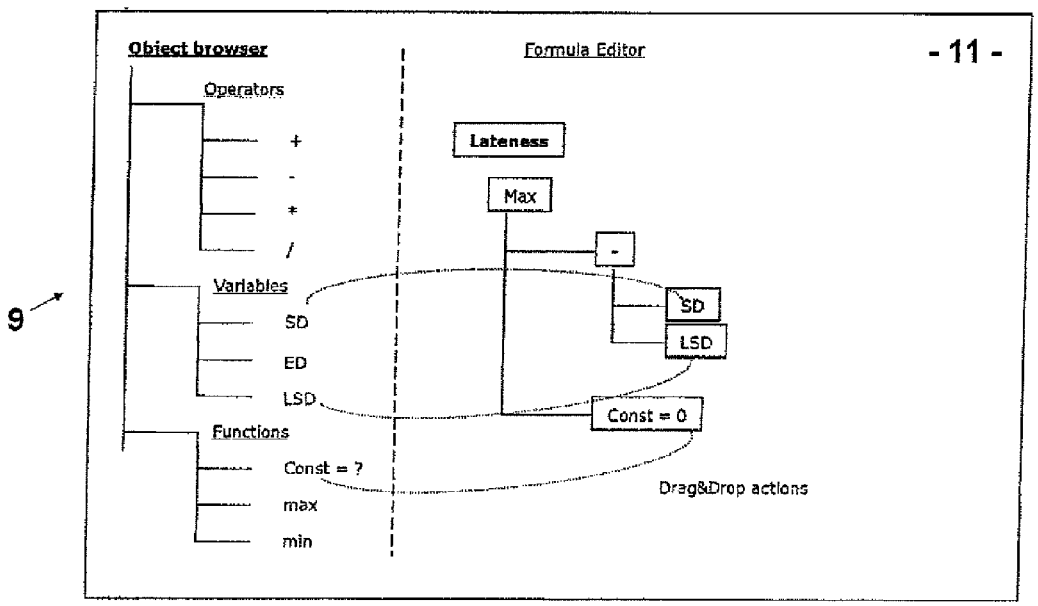
FIG. 3 is an illustration showing a formula editor of the scheduling tool according to the invention.

As shown in FIG. 3, the scheduling tool also contains a formula editor 9 which can be used to create a new formula template. The formula editor contains a graphical user interface 11. The formula editor also contains a tree organised set of mathematical operators, variables and functions. The formula editor is provided with an object browser allowing a user to select one or more above mentioned object(s) in order to build his own formula template. The user can obviously chose a new field that he has just defined following the above mentioned steps.

To define a new formula template, the user selects one or more variables and/or one or more mathematical operator(s) and/or one or more function(s) using a drag and drop action in the graphical user interface 11 of the Formula Editor. The new formula template takes the form of a graphical object which can easily be checked.

In the embodiment of FIG. 3 the user defines a new formula template in order to compute a new expression of the lateness (L). The new formula template is then L=Max [0; SD-LSD]. The innovative scheduling tool does not provide a built-in order lateness optimization algorithm based on DD. However, it provides a generic order lateness optimizer based on a template formula for computing the lateness for each order.

Figure 4:
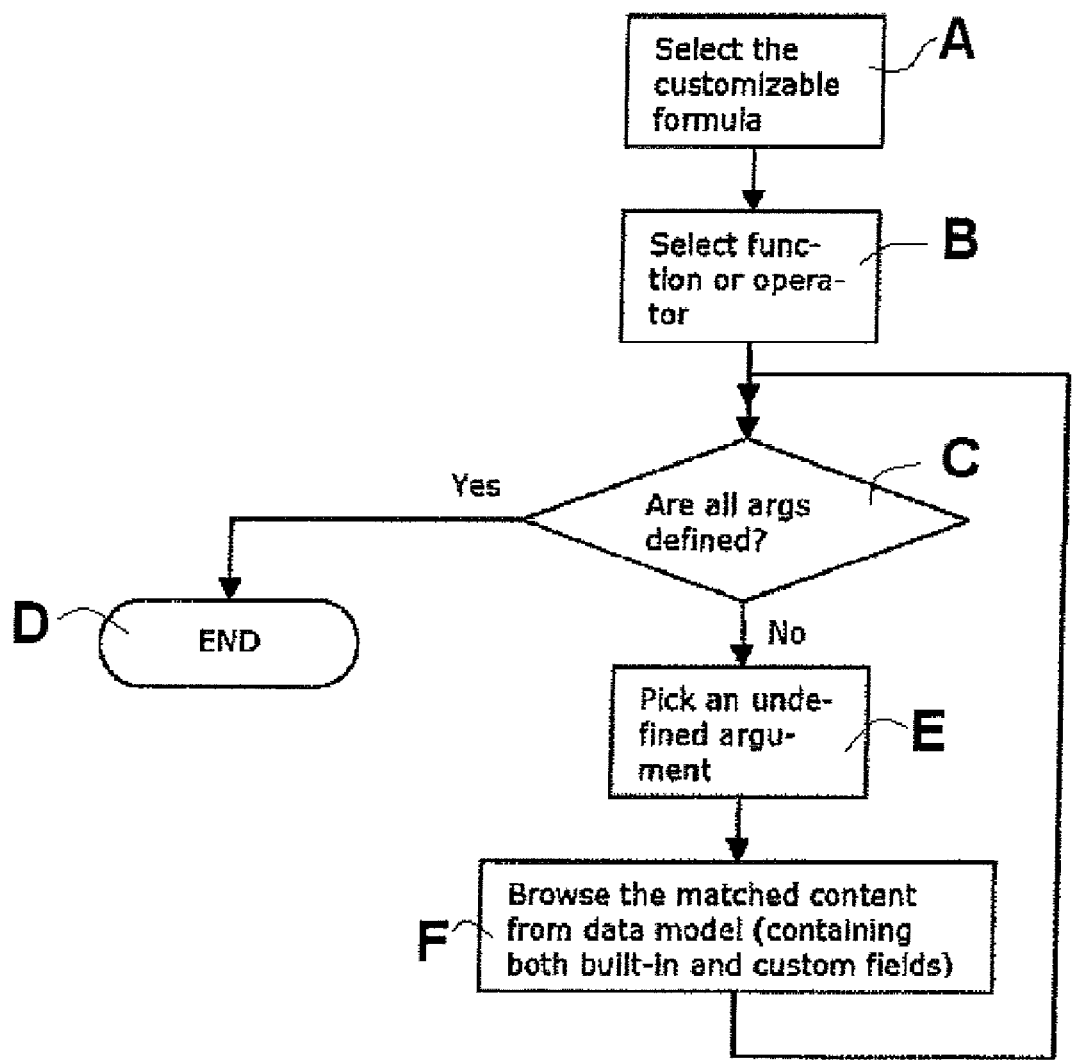
FIG. 4 is a flowchart showing the steps for creating a new formula template.

FIG. 4 is a flowchart describing how a formula template is customized. In step A the user selects the formula template he wants to modify using the browser of the formula editor. At step B, the user selects the variable and/or the function(s) and/or the operator(s) used in the customized formula template. At step C, the formula editor verifies that all the arguments needed by the function(s) and/or the operator(s) used in the new Formula Template are defined. If it's the case an end step D is executed. If it is not the case, at step E the Scheduling tool asks the user to choose one undefined argument of the formula/function(s). At step F, the scheduling tool allows the user to browse all fields contained in the data model to select which one must be used as an argument of the function/operator. The user can choose this field among data initially present in the scheduling tool data model or among fields that he has just defined as above mentioned. Thus, the argument of the formula is linked to the selected data model field and the formula will be executed using the proper data values (read from built-in data base model or read from remote data base or assigned by the user as described above).

The invention provides a way of customizing scheduling tools without any software coding activity. The customization can be accomplished without any effort and does not require any software development skill. The customisation can be implemented by the final customer without requiring any third-party developed module.

The invention claimed is:

1. A non-transient computer-readable medium having a set of computer-executable instructions stored thereon for implementing a customizable scheduling tool usable in a system for managing and controlling manufacturing processes planned by enterprise resource planning (ERP) and produced by a plant floor, wherein a manufacturing executing system (MES) implements the manufacturing process planned and controls a corresponding production at the plant floor, the scheduling tool comprising:
a set of built in data relating to the plant floor forming a data model and built-in formula templates;
means for defining new data, said means for defining new data being operable to edit new fields to expand the set of built in data; and
means for modifying the built-in formula template.

2. The non-transient computer-readable medium according to claim 1, wherein said means for defining new data includes a data model editor having a graphical user interface, and means for editing a new data field.

3. The non-transient computer-readable medium according to claim 2, wherein said data model editor has a set of tree organized data forming a build-in data model.

4. The non-transient computer-readable medium according to claim 3, further comprising means for adding in the new data field in the data model being a tree organized data model.

5. The non-transient computer-readable medium according to claim 4, wherein values taken by the new field comes from one of a database model of the customizable scheduling tool, are derived from data of the database model, and are external data provided by a user.

6. The non-transient computer-readable medium according to claim 1, wherein said means for modifying the built-in formula template contains a formula editor having a graphical user interface operable to create a new formula template.

7. The non-transient computer-readable medium according to claim 6, wherein said formula editor has at least one of a tree organised set of variables, mathematical operators and functions usable to build a new formula template.

8. The non-transient computer-readable medium according to claim 7, further comprising an object browser usable to select at least one of at least one variable, a mathematical operator, and a function contained in said formula editor to modify the built-in formula template.

9. The non-transient computer-readable medium according to claim 6, wherein said formula editor has at least a tree organised set of mathematical operators and a tree organised set of functions usable to build the new formula template.

10. The non-transient computer-readable medium according to claim 6, wherein the built-in formula template is a mathematical formula.

11. A manufacturing executing system (MES), comprising:
a non-transient computer-readable medium having a set of computer-executable instructions stored thereon for implementing a customizable scheduling tool containing a set of built in data relating to a plant floor forming a data model and built-in formula templates, means for defining new data, said means for defining new data being operable to edit new fields to expand the set of built in data, and means for modifying the built-in formula template.

12. A method of customizing a formula template using a customizable scheduling tool, which comprises the steps of:
a) using a computing machine, selecting a built-in formula template to modify;
b) using the computing machine, selecting at least one of at least one variable, a function, and an operator contained in a formula editor using a browser of the formula editor;
c) using the computing machine, verifying that at least one of the variable, an argument used in the function, and the operator is defined;
d) using the computing machine, allowing a user to browse a data model to associate a proper data field to at least one of the variable, an argument for the variable and arguments undefined; and
e) using the computing machine, linking a new selected data field to one of a formula template variable and the argument.

13. The method according to claim 12, wherein a value of each data field comes from one of a built-in database of the customizable scheduling tool, a remote database, and has been introduced by the user.

14. The method according to claim 12, wherein at least one of the variables selected in step b) is linked to a new data field introduced in the data model of the customizable scheduling tool by the user.

15. The method according to claim 12, wherein step b) includes selecting at least one of the function and the operator contained in the formula editor using the browser of the formula editor.

16. The method according to claim 12, wherein the built-in formula template is a mathematical formula.

* * * * *